United States Patent
Laas et al.

(10) Patent No.: US 11,795,262 B2
(45) Date of Patent: *Oct. 24, 2023

(54) POLYETHER-MODIFIED POLYISOCYANATE COMPOSITION

(71) Applicant: Covestro Deutschland AG, Leverkusen (DE)

(72) Inventors: Hans-Josef Laas, Odenthal (DE); Raul Pires, Cologne (DE); Hao Liu, Shanghai (CN); Yaguang Ma, Shanghai (CN); Jianping Shen, Shanghai (CN); Junchao Zheng, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/009,039

(22) PCT Filed: Jun. 28, 2021

(86) PCT No.: PCT/EP2021/067604
§ 371 (c)(1),
(2) Date: Dec. 8, 2022

(87) PCT Pub. No.: WO2022/002808
PCT Pub. Date: Jan. 6, 2022

(65) Prior Publication Data
US 2023/0192937 A1   Jun. 22, 2023

(30) Foreign Application Priority Data
Jun. 29, 2020 (CN) .......................... 202010607517.2
Oct. 26, 2020 (EP) ..................................... 20203838

(51) Int. Cl.
C08G 18/28 (2006.01)
C09D 175/08 (2006.01)

(52) U.S. Cl.
CPC .......... *C08G 18/283* (2013.01); *C09D 175/08* (2013.01); *C08G 2150/00* (2013.01); *C08G 2170/00* (2013.01); *C08G 2190/00* (2013.01)

(58) Field of Classification Search
CPC .............................. C08G 18/283; C09D 175/08
See application file for complete search history.

(56) References Cited

U.S. PATENT DOCUMENTS

| | | |
|---|---|---|
| 3,428,610 A | 2/1969 | Wolfgang |
| 4,265,798 A | 5/1981 | Mishra |
| 4,379,905 A | 4/1983 | Stemmler et al. |
| 4,433,095 A | 2/1984 | Hombach et al. |
| 4,487,928 A | 12/1984 | Richter et al. |
| 4,604,418 A | 8/1986 | Shindo et al. |
| 4,663,377 A | 5/1987 | Hombach et al. |
| 4,837,359 A | 6/1989 | Woynar et al. |
| 4,960,848 A | 10/1990 | Scholl et al. |
| 4,994,541 A | 2/1991 | Dell et al. |
| 5,076,958 A | 12/1991 | Pedain et al. |
| 5,252,696 A * | 10/1993 | Laas ..................... C08G 18/706 528/49 |
| 5,889,065 A * | 3/1999 | Kirchmeyer ............. C08J 3/226 524/715 |
| 6,051,634 A | 4/2000 | Laas et al. |
| 6,204,323 B1 | 3/2001 | Wamprecht et al. |
| 6,426,414 B1 | 7/2002 | Laas et al. |
| 6,777,523 B1 | 8/2004 | Laas et al. |
| 7,531,599 B2 | 5/2009 | Doerr et al. |
| 7,553,902 B2 | 6/2009 | Haberle et al. |
| 7,927,704 B2 | 4/2011 | Mager et al. |
| 9,926,402 B2 | 3/2018 | Laas et al. |
| 2003/0055197 A1* | 3/2003 | Morikawa ............ C08G 18/718 528/44 |
| 2004/0067315 A1 | 4/2004 | Niesten et al. |
| 2007/0104962 A1 | 5/2007 | Laas et al. |

(Continued)

FOREIGN PATENT DOCUMENTS

| | | |
|---|---|---|
| CN | 106147560 A | 11/2016 |
| DE | 1914365 A1 | 10/1970 |
| DE | 1670666 A1 | 7/1971 |
| DE | 3240613 A1 | 5/1984 |
| DE | 102009012312 A1 | 9/2010 |
| EP | 0100129 A1 | 2/1984 |
| GB | 809809 A | 3/1959 |
| GB | 1386399 A | 3/1975 |
| GB | 1391066 A | 4/1975 |
| GB | 2221465 A | 2/1990 |
| GB | 2222161 A | 2/1990 |
| JP | 2001294643 A * | 10/2001 |

OTHER PUBLICATIONS

JP-2001294643-A_10-2001_English Translation.*

(Continued)

*Primary Examiner* — Michael L Leonard
(74) *Attorney, Agent, or Firm* — THE WEBB LAW FIRM

(57) ABSTRACT

The present invention relates to a polyether-modified polyisocyanate composition, which is obtainable by reacting a system containing the following components: a) a polyisocyanate having an isocyanate group functionality of 2-4.5; b) a polyoxyalkylene monoether alcohol; and c) optionally a catalyst; the polyoxyalkylene monoether alcohol has a number-average molecular weight of 900 g/mol-2000 g/mol and an oxypropylene group content of 45 wt. %-100 wt. %, relative to the total weight of the oxyalkylene group of the polyoxyalkylene monoether alcohol; the system has an equivalent ratio of isocyanate group to hydroxyl group of 5:1-110:1; the polyisocyanate composition has the following characteristics: i) the average isocyanate functionality is 1.8-4.1; ii) the isocyanate group content is 8-20 wt. %; and iii) the amount of the polyoxyalkylene monoether structure is greater than 10 wt. % and less than 50 wt. %, for characteristics ii) and iii), relative to the total weight of the polyisocyanate composition.

12 Claims, No Drawings

(56) References Cited

U.S. PATENT DOCUMENTS

| | | |
|---|---|---|
| 2009/0209711 A1 | 8/2009 | Jono et al. |
| 2010/0105833 A1 | 4/2010 | Keller et al. |
| 2011/0294934 A1 | 12/2011 | Wamprecht et al. |
| 2012/0101210 A1 | 4/2012 | Nennemann et al. |

OTHER PUBLICATIONS

European Polymer Journal, 16, 1979, pp. 147-148.
International Search Report, PCT/EP2021/067604, dated Aug. 20, 2021, Authorized officer: Martin Bergmeier.

* cited by examiner

POLYETHER-MODIFIED POLYISOCYANATE COMPOSITION

CROSS REFERENCE TO RELATED APPLICATIONS

This application is a national stage application under 35 U.S.C. § 371 of PCT/EP2021/067604, filed Jun. 28, 2021, which claims benefit of EP Application No. 20203838.6, filed Oct. 26, 2020, and CN Application No. 202010607517.2, filed Jun. 29, 2020, all of which are incorporated herein by reference in their entireties.

TECHNICAL FIELD

The present invention refers to a polyether-modified polyisocyanate composition and a preparation process thereof, use thereof as the starting component in the preparation of polyurethane, use thereof as the crosslinking component to be used in the solvent-borne or solvent-free coating, adhesive or sealant, use thereof as the starting component to be used in the preparation of the polyisocyanate blocked by a blocking agent, use thereof in improving the working time of the coating, adhesive or sealant, a coating, adhesive or sealant containing the same, in particular a solvent-borne or solvent-free two-component coating containing the same.

BACKGROUND TECHNOLOGY

The solvent-borne or solvent-free two-component coating containing an aspartic ester is widely used and particularly widely used as a floor coating, because the two-component coating has the advantages of weather resistance, wear resistance, humidity and heat resistance and salt spray resistance, and can meet the requirements of high solid contents, low viscosity and environmental protection. The above solvent-borne or solvent-free two-component coatings generally contain a polyisocyanate component in addition to the aspartic ester. In practice, upon mixing the polyisocyanate and the aspartic ester, they react rapidly to form a highly cross-linked, solvent-free polyurea coating, usually within a few seconds to a few minutes. Due to such a short working time, the application of the solvent-borne or solvent-free two-component coating cannot be achieved by means of the application mode such as roll coating and brush coating widely used in the field of floor, and only the special spraying equipment can be used for the application of the solvent-borne or solvent-free two-component coating, so that the cost and difficulty of application are increased, and the utility of the aspartic ester coating in the field of floor and the like is greatly limited.

The current methods for prolonging the working time of the solvent-borne or solvent-free two-component coating containing an aspartic ester mainly comprise: 1) A large amount of active diluent or solvent is added into a coating to reduce the viscosity-increasing speed of the coating so as to ensure a sufficient working time, but many active diluents (such as vinylene carbonate) and solvents have certain toxicity, and the addition of a large amount of active diluent or solvent causes additional environmental pollution and does not meet the trend and the requirement of environmental protection, e.g. as described in CN106147560A; 2) A low-activity isocyanate-reactive compound is chosen to extend the working time, but to substantially extend the drying time of the coating and not to meet the drying requirements for industrial applications; 3) A low-activity isocyanate, e.g. macromolecular isocyanate prepolymer, is selected to reduce the reaction activity so as to ensure that the coating has a sufficient working time, but the low-activity isocyanate prepolymer generally has high viscosity, so that not only the application difficulty is increased, but also the drying efficiency of the coating is slowed down, the hardness of the coating layer formed from this kind of coating is low, and the surface of the coating layer cannot be completely dried even for a long time, for example, as described in US20040067315A, CN102300894, U.S. Pat. No. 3,428,610 and WO2007/039133. Therefore, the low-activity isocyanate is only suitable for some applications in the field of polyurethane elastomer or water-proof coating.

DE102009012312A1 discloses a polyisocyanate, which is obtained by reacting a diphenylmethane diisocyanate prepolymer with a mono-functional polypropylene polyether alcohol having a number-average molecular weight of 500 g/mol-25000 g/mol or a mixture of the mono-functional polypropylene polyether alcohol and a poly-functional polyether alcohol, the polyisocyanate has a high functionality and a low viscosity and contains very little free small-molecular diisocyanate. The polyisocyanate is usually used as a component of one-component or two-component binders or sealants, but are often used in the soft and hard foam industry because of its high drying speed.

DE1914365C3 discloses a process for preparing a polyurethane sealing material, which is obtained by reacting a mono-functional polyoxyethylene polyether alcohol having a number-average molecular weight of 100 g/mol-2000 g/mol with a toluene diisocyanate-based polyisocyanate.

The patent applications such as DE50313746 D1, U.S. Pat. Nos. 5,252,696, 6,426,414, DE19863684181, DE19813112117, DE19958170 A1, DE59810651 D1, DE19822890 A1, DE502006010104 D1, DE102006008690 A1, US2010105833A and US2012101210A also describe techniques for reacting mono-functional polyoxyethylene polyether alcohols and isocyanates to form polyisocyanates. The kind of polyisocyanates can be dispersed in water to be used as cross-linkers in two-component aqueous coatings and adhesives.

The present invention is dedicated to finding a polyisocyanate capable of combining a long working time, a high bubble-free film thickness (BFFT) and fast drying performance, and a high hardness of the coating layer formed from the coating containing the same.

SUMMARY OF THE INVENTION

The present invention refers to a polyether-modified polyisocyanate composition and a preparation process thereof, use thereof as the starting component in the preparation of polyurethane, use thereof as the crosslinking component to be used in the solvent-borne or solvent-free coating, adhesive or sealant, use thereof as the starting component to be used in the preparation of the polyisocyanate blocked by a blocking agent, use thereof in improving the working time of the coating, adhesive or sealant, a coating, adhesive or sealant containing the same, in particular a solvent-borne or solvent-free two-component coating containing the same. In the following the solvent-borne or solvent-free two-component coating is also named as solvent-borne or solvent-free two-component coating composition.

The polyether-modified polyisocyanate composition according to the present invention is obtainable by the reaction of a system containing the following components:

a) a polyisocyanate having an isocyanate group functionality of 2-4.5, containing at least 35 wt. % of hexamethylene diisocyanate trimer, pentamethylene diisocyanate trimer or a combination thereof;
b) a polyoxyalkylene monoether alcohol; and
c) optionally a catalyst;
the polyoxyalkylene monoether alcohol has a number-average molecular weight of 900 g/mol-2000 g/mol and an oxypropylene group content of 45 wt. %-100 wt. %, relative to the total weight of the oxyalkylene group of the polyoxyalkylene monoether alcohol;
the system has an equivalent ratio of isocyanate group to hydroxyl group of 5:1-110:1;
the polyisocyanate composition has the following characteristics:
i) the average isocyanate functionality is 1.8-4.1;
ii) the isocyanate group content is 8 wt. %-20 wt. %, relative to the total weight of the polyisocyanate composition; and
iii) the amount of the polyoxyalkylene monoether structure is greater than 10 wt. % and less than 50 wt. %, relative to the total weight of the polyisocyanate composition.

According to one aspect of the present invention, there is provided a process for preparing the polyether-modified polyisocyanate composition provided according to the present invention, characterized in that a system containing component a) polyisocyanate having an isocyanate group functionality of 2-4.5, component b) polyoxyalkylene monoether alcohol and optionally component c) catalyst is mixed and reacted to form a polyether-modified polyisocyanate composition having the following characteristics: i) the average isocyanate functionality is 1.8-4.1; ii) the isocyanate group content is 8-20 wt. %, relative to the total weight of the polyisocyanate composition; and iii) the amount of the polyoxyalkylene monoether structure is greater than 10 wt. % and less than 50 wt. %, relative to the total weight of the polyisocyanate composition; wherein the component a) polyisocyanate contains at least 35 wt. % of hexamethylene diisocyanate trimer, pentamethylene diisocyanate trimer or a combination thereof; the component b) polyoxyalkylene monoether alcohol has a number-average molecular weight of 900 g/mol-2000 g/mol and an oxypropylene group content of 45 wt. %-100 wt. %, relative to the total weight of the oxyalkylene group of the polyoxyalkylene monoether alcohol; the system has an equivalent ratio of isocyanate group to hydroxyl group of 5:1-110:1.

According to another aspect of the present invention, there is provided the use of the polyether-modified polyisocyanate composition provided according to the present invention as the starting component to prepare the polyurethane.

According to another aspect of the present invention, there is provided the use of the polyether-modified polyisocyanate composition provided according to the present invention as the crosslinking component to be used in the solvent-borne or solvent-free coating, adhesive or sealant.

According to another aspect of the present invention, there is provided the use of the polyether-modified polyisocyanate composition provided according to the present invention as the starting component to prepare the polyisocyanate blocked with a blocking agent.

According to another aspect of the present invention, there is provided a coating, adhesive or sealant containing the polyether-modified polyisocyanate composition provided according to the present invention.

According to another aspect of the present invention, there is provided a substrate coated with the coating, adhesive or sealant provided according to the present invention.

According to another aspect of the present invention, there is provided the use of the polyether-modified polyisocyanate composition provided according to the present invention in improving the working time of the coating, adhesive or sealant.

According to another aspect of the present invention, there is provided a solvent-borne or solvent-free two-component coating, which contains an A-component and a B-component, the A-component is a compound containing an isocyanate-reactive group, and the B-component is the polyether-modified polyisocyanate composition provided according to the present invention.

The polyether-modified polyisocyanate composition of the present invention can be applicable to the solvent-borne or solvent-free system.

The coating, adhesive or sealant containing the polyether-modified polyisocyanate composition of the present invention has the advantages of a high bubble-free film thickness (BFFT), a long operable time and high drying efficiency, and a high hardness of the coating layer formed therefrom.

DETAILED DESCRIPTION OF THE INVENTION

The present invention provides a polyether-modified polyisocyanate composition, which is obtainable by the reaction of a system containing the following components:
a) a polyisocyanate having an isocyanate group functionality of 2-4.5, containing at least 35 wt. % of hexamethylene diisocyanate trimer, pentamethylene diisocyanate trimer or a combination thereof;
b) a polyoxyalkylene monoether alcohol; and
c) optionally a catalyst;
the polyoxyalkylene monoether alcohol has a number-average molecular weight of 900 g/mol-2000 g/mol and an oxypropylene group content of 45 wt. %-100 wt. %, relative to the total weight of the oxyalkylene group of the polyoxyalkylene monoether alcohol;
the system has an equivalent ratio of isocyanate group to hydroxyl group of 5:1-110:1;
the polyether-modified polyisocyanate composition has the following characteristics:
i) the average isocyanate functionality is 1.8-4.1;
ii) the isocyanate group content is 8 wt. %-20 wt. %, relative to the total weight of the polyisocyanate composition; and
iii) the amount of the polyoxyalkylene monoether structure is greater than 10 wt. % and less than 50 wt. %, relative to the total weight of the polyisocyanate composition. The present invention also provides a process for preparing the polyether-modified polyisocyanate composition; use thereof as the starting component in the preparation of polyurethane; use thereof as the crosslinking component to be used in the solvent-borne or solvent-free coating, adhesive or sealant; use thereof as the starting component to be used in the preparation of the polyisocyanate blocked by a blocking agent; use thereof in improving the working time of the coating, adhesive or sealant; a coating, adhesive or sealant containing the same and a substrate coated with the coating, adhesive or sealant; and a solvent-borne or solvent-free two-component coating composition containing the same.

The solvent-free coating, adhesive or sealant herein refers to a coating, adhesive or sealant having a VOC content of less than 60 g/L.

The term "polyurethane" as used herein refers to polyurethane urea and/or polyurethane polyurea and/or polyurea and/or polythiourethane.

The term "trimer" as used herein refers to a pure trimer, or a mixture of a trimer and its higher homologue containing more than one isocyanurate ring.

Polyether-Modified Polyisocyanate Composition

The polyether-modified polyisocyanate composition of the present invention can contain a component that is not completely reacted in the system.

The polyether-modified polyisocyanate composition of the present invention is transparent and almost colorless.

The polyether-modified polyisocyanate composition is preferably hydrophobic. Hydrophobic here means incapable of dissolving as well dispersing in water.

The average isocyanate functionality of the polyether-modified polyisocyanate composition is preferably 2.0-4.0.

The isocyanate group content of the polyether-modified polyisocyanate composition is preferably 10 wt. %-20 wt. %, most preferably 12 wt. %-18 wt. %, relative to the total weight of the polyether-modified polyisocyanate composition.

The isocyanate group (NCO) content is preferably measured according to DIN-EN ISO 11909:2007-05.

The viscosity of the polyether-modified polyisocyanate composition in solvent-free form is preferably 1000 mPa·s-2000 mPa·s.

The viscosity is preferably determined according to DIN EN ISO 3219:1994-10 at 23° C. under a shear rate of 10 s⁻¹, with the MV-DIN rotor being chosen.

The amount of the polyoxyalkylene monoether structure of the polyether-modified polyisocyanate composition is preferably greater than 10 wt. % and less than 50 wt. %, further preferably 15 wt. %-45 wt. %, furthermore preferably 20 wt. %-40 wt. %, more preferably 20 wt. %-35 wt. %, most preferably 24 wt. %-35 wt. %, relative to the total weight of the polyether-modified polyisocyanate composition.

The polyether-modified polyisocyanate composition preferably has a color value of less than 120.

The polyether-modified polyisocyanate composition preferably contains no more than 0.5 wt. % of isophorone diisocyanate trimer, relative to the total weight of the polyether-modified polyisocyanate composition.

Most preferably, the polyether-modified polyisocyanate composition is free of isophorone diisocyanate trimer.

The polyether-modified polyisocyanate composition is preferably an aliphatic-based polyisocyanate composition, a cycloaliphatic-based polyisocyanate composition, or a combination thereof.

The average isocyanate functionality of the polyether-modified polyisocyanate composition is calculated according to the following formula:

$$F = \frac{(\sum equiv\,NCO - \sum equiv\,OH)}{\sum\left(\frac{equiv\,NCO}{f_{NCO}}\right) + \sum mol\,OH - \sum equiv\,OH}$$

wherein, F: the average isocyanate functionality of the polyether-modified polyisocyanate composition $\sum$Equiv NCO: the sum of the isocyanate functional group equivalents of component a polyisocyanate having an isocyanate group functionality of 2-4.5

$\sum$Equiv OH: the sum of the hydroxyl equivalents of component b polyoxyalkylene monoether alcohol $f_{NCO}$: the isocyanate group functionality of the component a) polyisocyanate having an isocyanate group functionality of 2-4.5 in the system, calculated from the isocyanate group content of the polyisocyanate and the molecular weight of the polyisocyanate, the molecular weight is determined by gel permeation chromatography (GPC) according to DIN 55672-1:2016-03.

$\sum$mol OH: the sum of the moles of hydroxyl functional groups of the component b polyoxyalkylene monoether alcohol.

Component a) Polyisocyanate Having an Isocyanate Group Functionality of 2-4.5

The polyisocyanate having an isocyanate group functionality of 2-4.5 has an isocyanate group functionality of preferably 2.5-4.4, most preferably 2.8-4.

The polyisocyanate having an isocyanate group functionality of 2-4.5 has in solvent-free form a viscosity of preferably 500 mPa·s-1500 mPa·s.

The polyisocyanate having an isocyanate group functionality of 2-4.5 has an isocyanate group content of preferably 15 wt. %-25 wt. %, most preferably 16 wt. %-24 wt. %, relative to the total weight of the component a) polyisocyanate having an isocyanate group functionality of 2-4.5.

The polyisocyanate having an isocyanate group functionality of 2-4.5 contains one or more of the following: hexamethylene diisocyanate trimer and pentamethylene diisocyanate trimer. The amount of hexamethylene diisocyanate trimer, pentamethylene diisocyanate trimer or a combination thereof is at least 35 wt. %, preferably at least 40 wt. %, further preferably at least 50 wt. %, most preferably at least 65 wt. %, relative to the total weight of the polyisocyanate having an isocyanate group functionality of 2-4.5.

Preferably, the component a) polyisocyanate having an isocyanate group functionality of 2-4.5 further contains an additional isocyanate.

The amount of the additional isocyanate is preferably not more than 65 wt. %, further preferably not more than 60 wt. %, more preferably not more than 50 wt. %, most preferably not more than 35 wt. %, relative to the total weight of the component a) polyisocyanate having an isocyanate group functionality of 2-4.5.

The additional isocyanate is preferably one or more of the following: aliphatic polyisocyanate and cycloaliphatic polyisocyanate, further preferably aliphatic polyisocyanate, furthermore preferably one or more of the following: aliphatic isocyanate uretdione and aliphatic isocyanate biuret, more preferably one or more of the following: hexamethylene diisocyanate uretdione and pentamethylene diisocyanate uretdione, most preferably hexamethylene diisocyanate uretdione.

The aliphatic polyisocyanate and the cycloaliphatic polyisocyanate each independently preferably have one or more of the following structures; iminooxadiazinedione, isocyanurate, uretdione, allophanate and biuret. The aliphatic polyisocyanate and the cycloaliphatic polyisocyanate are each independently prepared by simple modification of diisocyanate and synthesized from at least two diisocyanates, for example, as described in DE-OS 1670666, 3700209, 3900053, EP A 336205 and EPA339396. The diisocyanate is preferably a diisocyanate having a number average molecular weight of 140 g/mol-400 g/mol and containing aliphatically and/or cycloaliphatically bonded isocyanate group(s), and is preferably one or more of the following: 1,4-diisocyanatobutane, 1,6-diisocyanatohexane (HDI), 1,5-diisocyanatopentane (PDI), 1,5-diisocyanato-2,2-dimethylpentane, 2,2,4- and 2,4,4-trimethyl-1,6-diisocyanatohexanes, 1,10-diisocyanatodecane, 1-Isocyanato-3,3,5-trimethyl-5-isocyanatomethylcyclohexane (isophorone diisocyanate, IPDI), 1,3- and 1,4-diisocyanatocyclohexanes, 4,4'-diisocyanatodicyclohexylmethane and a mixture of these diisocyanates and is more preferably one or more of the following: 1,4-diisocyanatobutane, 1,6-diisocyanatohexane (HDI), 1,5-diisocyanatopentane (PDI), 1,5-diisocyanato-2,2-dimethylpentane, 2,2,4- and 2,4,4-trimethyl-1,6-diisocyanatohexanes, 1,10-diisocyanatodecane, 1,3- and 1,4-diisocyanatocyclohexanes, 4,4'-diisocyanatodicyclohexylmethane and a mixture of these diisocyanates.

The amount of the hexamethylene diisocyanate uretdione is preferably not more than 65 wt. %, further preferably not more than 60 wt. %, more preferably not more than 50 wt. %, most preferably not more than 35 wt. %, relative to the total weight of the component a) polyisocyanate having an isocyanate group functionality of 2-4.5.

When the system contains two or more polyisocyanates, the isocyanate group functionality of the polyisocyanate refers to the average isocyanate group functionality of the two or more polyisocyanates.

The amount of the polyisocyanate having an isocyanate group functionality of 2-4.5 is preferably greater than 30 wt. %, most preferably greater than 50 wt. %, relative to the total weight of the system.

Component b) Polyoxyalkylene Monoether Alcohol

The component b) polyoxyalkylene monoether alcohol has a number-average molecular weight of preferably 920 g/mol-1800 g/mol, further preferably 920 g/mol-1500 g/mol, most preferably 920 g/mol-1400 g/mol.

The oxypropylene group content of the component b) polyoxyalkylene monoether alcohol is preferably 50 wt. %-100 wt. %, further preferably 60 wt. %-100 wt. %, most preferably 80 wt. %-100 wt. %, relative to the total weight of the oxyalkylene group of the polyoxyalkylene monoether alcohol.

The component b) polyoxyalkylene monoether alcohol is preferably a polypropylene glycol monomethylether averagely containing 16-32 propylene oxide units, further preferably a polypropylene glycol monomethylether averagely containing 16-27 propylene oxide units, most preferably a polypropylene glycol monomethylether averagely containing 17-25 propylene oxide units.

The polyoxyalkylene monoether alcohol may be obtained by a known method, and the preferred starting components contain at least one of a monohydric alcohol and a secondary monoamine, and an oxyalkylene compound, the monohydric alcohol and the secondary monoamine being present either or both.

The monohydric alcohol is preferably a monohydric alcohol having a molecular weight of 32 g/mol-150 g/mol, for example the monohydric alcohol used according to EPA-206059, most preferably one or more of the following: methanol and butanol.

The secondary monoamine is preferably one or more of the following: dimethylamine and diethylamine.

The oxyalkylene compound preferably contains 45 wt. %-100 wt. %, further preferably 50 wt. %-100 wt. %, more preferably 60 wt. %-100 wt. %, most preferably 80 wt. %-100 wt. % of propylene oxide, relative to the total weight of the oxyalkylene compound.

The oxyalkylene compound may further comprise ethylene oxide, preferably in an amount of not more than 55 wt. %, further preferably not more than 40 wt. %, most preferably not more than 20 wt. %, relative to the total weight of the oxyalkylene compound.

The starting components are preferably reacted at 40° C.-150° C., most preferably at 60° C.-130° C.

The equivalent ratio NCO/OH of the starting components is preferably 5:1-110:1, most preferably 8:1-90:1. The starting components are preferably reacted further until the theoretically calculated isocyanate content is reached.

The hydroxyl value of the component b) polyoxyalkylene monoether alcohol is preferably 40 mgKOH/g-61 mgKOH/g.

When the system contains two or more polyoxyalkylene monoether alcohols, the number-average molecular weight of the polyoxyalkylene monoether alcohol refers to the average number-average molecular weight of two or more polyoxyalkylene monoether alcohols; the oxypropylene group content of the polyoxyalkylene monoether alcohol refers to the average oxypropylene group content of two or more polyoxyalkylene monoether alcohols, i.e., the average value of the oxypropylene group contents of two or more polyoxyalkylene monoether alcohols.

The number-average molecular weight of the polyoxyalkylene monoether alcohol is preferably be determined according to GBT 21863-2008 at 23° C. with the gel permeation chromatography by using tetrahydrofuran as the mobile phase and polyethylene glycol as the standard sample.

The calculation method of the oxypropylene group content of the polyoxyalkylene monoether alcohol is as follows:

$$\overline{PO} = \frac{\sum b*PO \% \, wt}{\sum b}$$

wherein:

$\overline{PO}$ is an average value of the oxypropylene group content of the polyoxyalkylene monoether alcohol $\Sigma b*PO\%wt$ is the sum of the amount of oxypropylene group in the polyoxyalkylene monoether alcohol $\Sigma b$ is the total amount of the oxyalkylene group of the polyoxyalkylene monoether alcohol.

When the system contains two or more polyoxyalkylene monoether alcohols, the system preferably contains at least one polyoxyalkylene monoether alcohol having a number-average molecular weight of preferably 900 g/mol-2000 g/mol, further preferably 920 g/mol-1800 g/mol, more preferably 920 g/mol-1500 g/mol, most preferably 920 g/mol-1400 g/mol; and an oxypropylene group content of preferably 45 wt. %-100 wt. %, further preferably 60 wt. %-100 wt. %, most preferably 80 wt. %-100 wt. %, relative to the total weight of the oxyalkylene group of the polyoxyalkylene monoether alcohol.

The amount of the component b) polyoxyalkylene monoether alcohol is preferably greater than 10 wt. % and less than 50 wt. %, further preferably 15 wt. %-45 wt. %, furthermore preferably 20 wt. %-40 wt. %, more preferably 20 wt. %-35 wt. %, most preferably 24 wt. %-35 wt. %, relative to the total weight of the system.

Component c) Catalyst

The component c) catalyst is preferably one or more of the following: sulfonic acid catalysts, phosphoric acid catalysts, tertiary amine catalysts, tertiary phosphine catalysts, tertiary hydroxyalkyl amine catalysts and metal catalysts, most preferably one or more of the following: metal catalysts and phosphoric acid catalysts.

The sulfonic acid catalyst is preferably one or more of the following: methane sulfonic acid, paratoluenesulfonic acid, trifluoromethanesulfonic acid, perfluorobutanesulfonic acid, dodecylbenzene sulfonic acid, methyl- and ethyl-toluenesulfonic acid salts.

The phosphoric acid catalyst is preferably one or more of the following: silylated acid, monoalkyl phosphate and dialkyl phosphate, further preferably one or more of the following: monobutyl phosphate, monotridecyl phosphate, dibutyl phosphate, dioctyl phosphate, trimethylsilyl methanesulfonate, trimethylsilyl trifluoromethanesulfonate, tris(trimethylsilyl) phosphate and diethyl trimethylsilyl phosphate, most preferably one or more of the following: monobutyl phosphate and dibutyl phosphate.

The tertiary amine catalyst is preferably one or more of the following: triethylamine, tributylamine, N,N-dimethylaniline, N-ethylpiperidine and N,N'-dimethylpiperazine.

The tertiary phosphine catalyst is preferably one or more of the following: triethylphosphine, tributylphosphine and dimethylphenylphosphine.

The tertiary hydroxyalkylamine catalyst is preferably those described in GB2221465 and/or GB2222161, most preferably one or more of the following: triethanolamine, N-methyldiethanolamine, dimethylethanolamine, a mixture of a tertiary bicycloamine (e.g., DBU) with a low molecular weight simple aliphatic alcohol, N-isopropyldiethanolamine, and 1-(2-hydroxyethyl)pyrrolidine.

The metal catalyst may be those described in DEA3240613, preferably one or more of the following: caprylate salts of manganese, caprylate salts of iron, caprylate salts of cobalt, caprylate salts of nickel, caprylate salts of copper, caprylate salts of zinc, caprylate salts of zirconium, caprylate salts of cerium, caprylate salts of lead, naphthenate salts of manganese, naphthenate salts of iron, naphthenate salts of cobalt, naphthenate salts of nickel, naphthenate salts of copper, naphthenate salts of zinc, naphthenate salts of zirconium, naphthenate salts of cerium, naphthenate salts of lead, and mixtures of the above-mentioned salts with acetate salt(s) of lithium, sodium, potassium, calcium or barium. The metal catalyst may also be those described in DEA3219608, preferably one or more of the following: sodium salts of straight or branched alkane carboxylic acids having up to 10 carbon atoms and potassium salts of straight or branched alkane carboxylic acids having up to 10 carbon atoms, wherein the carboxylic acid is preferably one or more of the following: propionic acid, butyric acid, valeric acid, hexanoic acid, heptylic acid, octanoic acid, nonylic acid, decanoic acid and undecanoic acid. The metal catalyst may also be an alkali metal salt and/or an alkaline earth metal salt as described in EPA0100129, preferably one or more of the following: said salts of aliphatic, cycloaliphatic or aromatic mono- and polycarboxylic acids having 2-20 carbon atoms, e.g. sodium benzoate or potassium benzoate. The metal catalyst may also be an alkali metal phenolate known from GB1391066A and GB1386399A, preferably one or more of the following: a sodium phenolate and a potassium phenolate. The metal catalyst may also be those known from GB 809809, preferably one or more of the following: an alkali metal oxide, an alkaline earth metal oxide, an alkali metal hydroxide, an alkaline earth metal hydroxide, an alkali metal carbonate, an alkaline earth metal carbonate, an alkali metal alkoxide, an alkaline earth metal alkoxide, an alkali metal phenolate, an alkaline earth metal phenolate, an alkali metal salt of an alkylenable compound, a metal salt of a weak aliphatic carboxylic acid, a metal salt of a cycloaliphatic carboxylic acid, a basic alkali metal compound complexed with a crown ether and a basic alkali metal compound complexed with a polyether alcohol. The metal catalyst may also be a pyrrolidone potassium salt known from EPA0033581. The metal catalyst may also be a mono- or polycyclic complex of titanium, zirconium and/or hafnium as known from EPA2883895, preferably one or more of the following: zirconium tetra-n-butyrate, zirconium tetra-2-ethylhexanoate, and zirconium tetra-(2-ethylhexoxide). The metal catalyst may also be a tin compound of the type as described in European Polymer Journal, 16, 1979, 147-148, and is preferably one or more of the following: dibutyltin dichloride, diphenyltin dichloride, triphenylstannanol, tributyltin acetate, tributyltin oxide, tin octoate, dibutyl(dimethoxy)stannane, and imidazole tributyltin.

The metal salt of the weak aliphatic carboxylic acid and the metal salt of the cycloaliphatic carboxylic acid are each independently preferably one or more of the following: sodium methoxide, sodium acetate, potassium acetate, sodium acetoacetate, lead 2-ethylhexanoate, and lead naphthenate.

The basic alkali metal compound complexed with the crown ether and the basic alkali metal compound complexed with the polyether alcohol are each independently preferably one or more of the following: the complexes of sodium or potassium carboxylates, which are known from EPA0056158 and EPA0056159.

When the system contains a metal catalyst, a terminator is required after the reaction of the system is finished. Further, the above-mentioned phosphoric acid catalyst, sulfonic acid catalyst and their derivatives may be used herein as a terminator. In addition to these two acid catalysts, other inorganic acids such as hydrochloric acid, phosphorous acid, acid chlorides such as acetyl chloride, benzoyl chloride or isophthaloyl dichloride can also be used as terminator.

The amount of the catalyst is 0-0.02 wt. %, relative to the total weight of the system.

Solvent

The system may further comprise a solvent, which is inert towards isocyanate groups.

The solvent may be known, and preferably one or more of the following: ethyl acetate, butyl acetate, ethylene glycol monomethyl, ethylether acetic acid ester, 1-acetic acid 2-methoxypropyl-2-acetic acid ester, 2-butanone, 4-methyl-2-pentanone, cyclohexanone, toluene, propylene-glycol diacetate, diethylene glycol dimethyl ether, diethylene glycol ethyl ester, butylether acetic acid ester, N-methylpyrrolidone and N-methylcaprolactam.

The amount of the solvent is 0-10 wt. %, relative to the total weight of the system.

Process for Preparing the Polyether-Modified Polyisocyanate Composition

Preferably, the component b) polyoxyalkylene monoether alcohol is bonded to the component a) polyisocyanate via a urethane group.

It is possible in the system that excessive component a) polyisocyanate having an isocyanate group functionality of 2-4.5 is present in the polyether-modified polyisocyanate composition.

The polyether-modified polyisocyanate composition, when being used, may be mixed with an isocyanate other than the polyether-modified polyisocyanate composition of the present invention, for example, may be mixed with an unmodified isocyanate.

Use and Two-Component Coating

The polyether-modified polyisocyanate composition can be used as a starting component for the production of polyurethanes by the isocyanate polyaddition process.

The polyether-modified polyisocyanate compositions can also be used as the crosslinking component in the solvent-borne or solvent-free two-component coating.

The molar ratio of isocyanate groups of the polyether-modified polyisocyanate composition to isocyanate-reactive groups of the compound containing an isocyanate-reactive group in the two-component coating composition is preferably 2:1.

The isocyanate-reactive group is preferably one or more of the following: hydroxyl, thiol and amino, further preferably one or more of the following: secondary hydroxyl and amino, most preferably secondary amino.

The compound containing an isocyanate-reactive group preferably contains at least one compound corresponding to formula I:

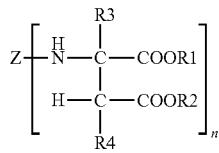

I wherein Z represents an organic group having a valence of n and being inert to isocyanate groups at a temperature of 100° C. or lower, preferably a divalent hydrocarbyl obtained by removing amino groups from aliphatic, araliphatic or cycloaliphatic polyamines, most preferably a diamine;

$R_1$ and $R_2$ may be identical or different and represent organic groups inert to isocyanate groups at 100° C. or lower, preferably one or more of the following: methyl and ethyl;

$R_3$ and $R_4$ may be identical or different and represent hydrogen or organic groups inert to isocyanate groups at 100° C. or lower, preferably hydrogen;

n represents an integer of at least 2, preferably an integer of 2-4, most preferably 2.

The compound containing an isocyanate-reactive group is prepared in a known manner by reacting a primary polyamine corresponding to formula II:

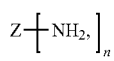

II with an optionally substituted maleate and/or an optionally substituted fumarate corresponding to formula III:

III.

The primary polyamine corresponding to formula II is preferably one or more of the following: ethylene diamine, 1,2-diaminopropane, 1,4-diaminobutane, 1,3-diaminopentane, 1,6-diaminohexane, 2,5-diamino-2,5-dimethylhexane, 2,2,4-trimethyl-1,6-diaminohexane, 2,4,4-trimethyl-1,6-diaminohexane, 1,11-diaminoundecane, 1,12-diaminododecane, 1,3-cyclohexane diamine, 1,4-cyclohexane diamine, 1-amino-3,3,5-trimethyl-5-aminomethyl-cyclohexane, 2,4-hexahydrotoluylenediamine, 2,6-hexahydrotoluylenediamine, 2,4'-diaminodicyclohexylmethane, 4,4'-diaminodicyclohexylmethane and 3,3'-dialkyl-4,4'-diamino-dicyclohexylmethane (for example 3,3'-dimethyl-4,4'-diamino-dicyclohexylmethane and 3,3'-diethyl-4,4'-diamino-dicyclohexylmethane), most preferably one or more of the following: 1,4-diaminobutane, 1,6-diaminohexane, 2,2,4-trimethyl-1,6-diaminohexane, 2,4,4-trimethyl-1,6-diaminohexane, 1,3-cyclohexane diamine, 1,4-cyclohexane diamine, 1-amino-3,3,5-trimethyl aminomethylcyclohexane, 2,4-hexahydrotoluylenediamine, 2,6-hexahydrotoluylenediamine, 4,4'-diamino-dicyclohexylmethane, 3,3'-dimethyl-4,4'-diaminodicyclohexylmethane and 3,3'-diethyl-4,4'-diamino-dicyclohexylmethane.

The primary polyamine can also be aromatic polyamine, for example one or more of the following: 2,4-diaminotoluene, 2,6-diaminotoluene, 2,4'-diaminodiphenylmethane and 4,4'-diaminodiphenylmethane. Also suitable are relatively high molecular weight polyether polyamines containing an aliphatically bonded primary amino group, such as the product sold under the Jeffamine trademark by Texaco.

The compounds suitable for the preparation of the optionally substituted maleate and/or the optionally substituted fumarate corresponding to formula III are each independently preferably one or more of the following: dimethyl maleate, dimethyl fumarate, diethyl maleate, diethyl fumarate, di-n-butyl maleate, di-n-butyl fumarate and the corresponding maleates or fumarates substituted by methyl.

The compound containing an isocyanate-reactive group is most preferably an aspartic ester. For example, it is obtained by reacting the primary polyamine corresponding to formula II with the optionally substituted maleate and/or an optionally substituted fumarate corresponding to formula III in a proportion of at least 1:1 at a temperature of 0° C.-100° C. After the reaction, the excessive raw material can be removed by distillation. The reaction can be carried out without solvent or in the presence of suitable solvents such as methanol, ethanol, propanol, dioxane and a mixture of these solvents.

A-component and B-component of the solvent-borne or solvent-free two-component coating composition are preferably stored separately, and these two components are mixed before use to give the two-component system.

The two-component coating composition preferably further contains one or more of the following: auxiliary and additive.

Said application/coating can be carried out by using mechanical tools known to those skilled in the art or using a two-component spray gun.

The substrate is preferably one or more of the following: artificial stone, wood, artificial wood, marble, terrazzo, ceramic, linoleum, metal, mineral material, plastic, rubber, concrete, composite sheet, paper, leather and glass. The substrate may be pretreated. The pretreatment is preferably polishing and/or coating.

The coating is preferably used to protect floors, walls, surfaces of reinforced concrete or metal containers or other surfaces that need the protection.

Unless defined otherwise, all technical and scientific terms used herein have the same meanings as commonly understood by those skilled in the art to which this invention belongs. To the extent that the definitions of terms used in this specification conflict with meanings commonly understood by those skilled in the art to which this invention belongs, the definitions set forth herein prevail.

Unless otherwise indicated, all numbers expressing quantities of ingredients, reaction conditions, and the like used in the specification and claims are to be understood as being modified by the term "about". Accordingly, unless indicated to the contrary, the numerical parameters set forth herein are approximations that can vary depending upon the desired properties to be obtained.

As used in this specification, unless otherwise indicated, "a", "an", and "the/said" are intended to comprise "at least one" or "one or more". For example, "a component" refers to one or more components, and thus more than one component may be considered and may be employed or used in the practice of the described embodiments.

The expression "and/or" as used herein means one or all of the mentioned elements.

The use of "comprise" and "contain" herein encompasses the presence of the mentioned elements alone and the presence of other elements not mentioned in addition to the mentioned elements.

The present invention in particular pertains to the following aspects:

1. A polyether-modified polyisocyanate composition, which is obtainable by the reaction of a system containing the following components:
    a) a polyisocyanate having an isocyanate group functionality of 2-4.5, containing at least 35 wt. % of hexamethylene diisocyanate trimer, pentamethylene diisocyanate trimer or a combination thereof;
    b) a polyoxyalkylene monoether alcohol; and
    c) optionally a catalyst;
    the polyoxyalkylene monoether alcohol has a number-average molecular weight of 900 g/mol-2000 g/mol and an oxypropylene group content of 45 wt. %-100 wt. %, relative to the total weight of the oxyalkylene group of the polyoxyalkylene monoether alcohol;
    the system has an equivalent ratio of isocyanate group to hydroxyl group of 5:1-110:1;
    the polyisocyanate composition has the following characteristics:
    i) the average isocyanate functionality is 1.8-4.1;
    ii) the isocyanate group content is 8 wt. %-20 wt. %, relative to the total weight of the polyisocyanate composition; and
    iii) the amount of the polyoxyalkylene monoether structure is greater than 10 wt. % and less than 50 wt. %, relative to the total weight of the polyisocyanate composition.
2. The polyether-modified polyisocyanate composition according to aspect 1 or 2, characterized in that the amount of the polyoxyalkylene monoether structure is 15 wt. %-45 wt. %, preferably 20 wt. %-40 wt. %, further preferably 20 wt. %-35 wt. %, most preferably 24 wt. %-35 wt. %, relative to the total weight of the polyisocyanate composition.
3. The polyether-modified polyisocyanate composition according to any one of the above aspects, characterized in that the component a) polyisocyanate having an isocyanate group functionality of 2-4.5 further contains an additional isocyanate, the additional isocyanate is one or more of the following: aliphatic isocyanate uretdione and aliphatic isocyanate biuret.
4. The polyether-modified polyisocyanate composition according to aspect 3, characterized in that the additional isocyanate is one or more of the following: hexamethylene diisocyanate uretdione and pentamethylene diisocyanate uretdione.
5. The polyether-modified polyisocyanate composition according to any one of the above aspects, characterized in that the oxypropylene group content of the polyoxyalkylene monoether alcohol is 50 wt. %-100 wt. %, preferably 60 wt. %-100 wt. %, most preferably 80 wt. %-100 wt. %, relative to the total weight of the oxyalkylene group of the polyoxyalkylene monoether alcohol.
6. The polyether-modified polyisocyanate composition according to any one of the above aspects, characterized in that the amount of the polyoxyalkylene monoether alcohol is greater than 10 wt. % and less than 50 wt. %, preferably 15 wt. %-45 wt. %, further preferably 20 wt. %-40 wt. %, more preferably 20 wt. %-35 wt. %, most preferably 24 wt. %-35 wt. %, relative to the total weight of the system.
7. The polyether-modified polyisocyanate composition according to any one of the above aspects, characterized in that the number-average molecular weight of the component b) polyoxyalkylene monoether alcohol is 920 g/mol-1800 g/mol, preferably 920 g/mol-1500 g/mol, most preferably 920 g/mol-1400 g/mol.
8. The polyether-modified polyisocyanate composition according to any one of the above aspects, characterized in that the polyisocyanate composition contains no more than 0.5 wt. % of isophorone diisocyanate trimer, relative to the total weight of the polyisocyanate composition; most preferably the polyisocyanate composition does not contain isophorone diisocyanate trimer.
9. The polyether-modified polyisocyanate composition according to any one of the above aspects, characterized in that the component c) catalyst is one or more of the following: metal catalyst and phosphoric acid catalyst.
10. A process for preparing the polyether-modified polyisocyanate composition according to any one of the above aspects, characterized in that a system containing component a) polyisocyanate having an isocyanate group functionality of 2-4.5, component b) polyoxyalkylene monoether alcohol and optionally component c) catalyst is mixed and reacted to form a polyether-modified polyisocyanate composition having the following characteristics: i) the average isocyanate functionality is 1.8-4.1; ii) the isocyanate group content is 8-20 wt. %, relative to the total weight of the polyisocyanate composition; and iii) the amount of the polyoxyalkylene monoether structure is greater than 10 wt. % and less than 50 wt. %, relative to the total weight of the polyisocyanate composition; wherein the component a) polyisocyanate contains at least 35 wt. % of hexamethylene diisocyanate trimer, pentamethylene diisocyanate trimer or a combination thereof; the component b) polyoxyalkylene monoether alcohol has a number-average molecular weight of 900 g/mol-2000 g/mol and an oxypropylene group content of 45 wt. %-100 wt. %, relative to the total weight of the oxyalkylene group of the polyoxyalkylene monoether alcohol; the system has an equivalent ratio of isocyanate group to hydroxyl group of 5:1-110:1.
11. The process according to aspect 10, characterized in that the component b) polyoxyalkylene monoether alcohol is bonded to the component a) polyisocyanate via a urethane group.
12. Use of the polyether-modified polyisocyanate composition according to any of aspects 1-9 as the starting component to prepare the polyurethane.
13. Use of the polyether-modified polyisocyanate composition according to any of aspects 1-9 as the cross-linking component to be used in the solvent-borne or solvent-free coating, adhesive or sealant.
14. Use of the polyether-modified polyisocyanate composition according to any of aspects 1-9 as the starting component to prepare the polyisocyanate blocked with a blocking agent.
15. A coating, adhesive or sealant containing the polyether-modified polyisocyanate composition according to any of aspects 1-9.
16. The coating, adhesive or sealant according to aspect 15, characterized in that the coating, adhesive or sealant is solvent-borne or solvent-free.
17. A substrate coated with the coating, adhesive or sealant according to aspect 15 or 16.
18. Use of the polyether-modified polyisocyanate composition according to any of aspects 1-9 in improving the working time of a coating, adhesive or sealant.
19. A solvent-borne or solvent-free two-component coating, which contains an A-component and a B-component, the A-component is a compound containing an isocyanate-reactive group, and the B-component is the polyether-modified polyisocyanate composition according to any of aspects 1-9.
20. The two-component coating according to aspect 19, characterized in that the compound containing an isocyanate-reactive group is an aspartic ester.

EXAMPLES

All percentages in the present invention are by weight unless otherwise stated.

The analysis and measurement of the present invention are carried out at 23±2° C. and 50±5% relative humidity, unless otherwise stated.

The isocyanate group (NCO) content is measured according to DIN-EN ISO 11909:2007-05.

The number-average molecular weight of the isocyanate is determined at 23° C. according to DIN 55672-1:2016-03 with gel permeation chromatography by using tetrahydrofuran as the mobile phase and using polystyrene as standard.

The number-average molecular weight of the polyoxyalkylene monoether alcohol is determined according to GBT 21863-2008 at 23° C. with the gel permeation chromatography by using tetrahydrofuran as the mobile phase and polyethylene glycol as the standard sample.

The non-volatile component is determined according to DIN EN ISO 3251:2008-06, wherein the measurement conditions comprise the drying temperature of 120° C., the drying time of 2 hours, the test disc diameter of 75 mm and the test amount of 2±0.02 g, and the results are expressed in wt. %.

The viscosity is determined according to DIN EN ISO 3219:1994-10 at 23° C. under a shear rate of 10 s$^{-1}$, with the MV-DIN rotor being chosen.

The amino group content is determined according to AFAM 2011-06054.

The hydroxyl value is determined according to ASTM D4274.

The color value is determined according to DIN-EN1557:1997-03.

Bubble-free film thickness (BFFT): Coating layers with different thicknesses are prepared on glasses by means of a film thickness adjustable film scraper (the film thickness being set to 100 µm, 200 µm and 400 µm) (the test method of the coating thickness: the cured coating layer is peeled from the glass and measured with a film thickness measurement instrument); the application area is about 15 cm*10 cm; after the coating layer is cured for one day, if the surface of the coating layer is observed with naked eyes to have no bubbles, the bubble-free film thickness is considered to be more than or equal to the thickness of the coating layer. The desirable bubble-free film thickness is 100 µm or more.

Surface-drying time: a coating layer is prepared on a glass by means of a film scraper (the film thickness being set to 200 µm); and the measurement is carried out according to GB/T13477.5-2002 by touching the surface of the coating layer with a finger and determining the surface being dried if feeling tacky but without the coating sticking to the finger; the time period taken from the application of the coating to the glass surface until the surface of the coating layer being dried is considered as the surface-drying time. The desirable surface-drying time is less than 120 min.

Pendulum hardness: a coating layer is prepared on a glass by means of a film scraper (the film thickness being set to 200 µm), and the hardness of the coating layer is determined by using a BYK Pendulum hardness tester. The Pendulum hardness (1d) refers to the Pendulum hardness after the coating layer is stored for one day, and the Pendulum hardness (7d) refers to the Pendulum hardness after the coating layer is stored for seven days. The desirable Pendulum hardness (7d) is greater than 60 s.

Working time: the viscosity at which the mixing of the components of the coating is completed and no additional components are added is the initial viscosity, and the time it takes for the viscosity of the coating to reach twice the initial viscosity is the working time. The longer the working time is, the longer the operable time of the coating is. The desirable working time is 20 minutes or more.

Raw Materials and Reagents

Hexamethylene diisocyanate trimer 1: 850 g of hexamethylene diisocyanate (HDI) was charged into a four-necked flask equipped with a stirrer, a thermometer, a reflux condenser, a nitrogen gas blowing tube and a dropping funnel under a nitrogen atmosphere, and heated to 65° C. with stirring, and 5.5 g of trimethyl-2-methyl-2-hydroxyethylammonium hydroxide (a solution diluted to 5 wt. % with isobutanol) was then added, and when the NCO of the reaction solution was 45.6 wt. %, 1.1 g of di-n-butyl phosphate was added to terminate the reaction. Unreacted monomers were removed at 140° C. and 0.05 mbar by means of a thin-film evaporator to give a hexamethylene diisocyanate trimer 1 having a non-volatile content of 100 wt. %, a viscosity of 1200 mPa·s (23.5° C.), an NCO content of 23.0 wt. %, an HDI monomer concentration of 0.25 wt. % and a NCO functionality of 3.2.

Hexamethylene diisocyanate timer 2: The procedure for preparing the hexamethylene diisocyanate timer 1 was used, except that, a tetrabutylphosphonium fluoride solution (diluted to 50% with a solvent of isopropanol/methanol having a weight ratio of 2:1) was used as the catalyst, and when the NCO in the reaction solution reached 43%, dibutyl phosphate was added to terminate the reaction to give a hexamethylene diisocyanate timer 2 having a non-volatile content of 100 wt. %, a viscosity of 700 mPa·s (23.5° C.), a NCO content of 23.4 wt. %, a HDI monomer concentration of 0.25 wt. % and a NCO functionality of 3.2.

Hexamethylene diisocyanate uretdione 3: To 1000 g (5.95 mol) of hexamethylene diisocyanate (HDI) were successively added under dry nitrogen at room temperature, 2 g (0.2%) of N,N-diethylurea as stabilizer, 10 g (1.0%) of 1,3-butanediol as cocatalyst and 3 g (0.3%/0.015 mol) of tri-n-butylphosphine as catalyst, and the mixture was heated to 60° C. After a reaction time of 4 hours, the NCO content of the reaction mixture was 40.4%, corresponding to an oligomerization degree of 18.0%. 2.8 g (0.015 mol) of methyl p-toluene sulfonate was added to terminate the reaction, and the mixture was heated for 1 hour to 80° C. The thin-layer distillation was carried out at a temperature of 130° C. Then at 105° C. and under a pressure of 0.15 mbar, a colorless polyisocyanate containing uretdione groups was obtained, which had an NCO content of 21.4%, a monomeric HDI content of 0.07%, a viscosity of 185 mPa·s (23.5° C.) and a NCO functionality of 2.5.

Desmophen NH 1420: an aspartate having an amino group equivalent of 279, and a viscosity of 1500 mPa·s (25° C.), commercially available from Covestro AG, Germany.

Desmophen NH 2850: an aspartate having an amino group equivalent of 295, and a viscosity of 100 mPa·s (25° C.), commercially available from Covestro AG, Germany.

T01-A: a polyoxyalkylene monoether alcohol having an oxypropylene group accounting for 100 wt. % of the oxyalkylene group of the polyoxyalkylene monoether alcohol, a number-average molecular weight of 800 g/mol, and an OH-value of 66.6 mgKOH/g with the starting components being propylene oxide and n-butanol.

TP-10: a polyoxyalkylene monoether alcohol having an oxypropylene group accounting for 100 wt. % of the oxyalkylene group of the polyoxyalkylene monoether alcohol, a number-average molecular weight of 1000 g/mol, and an OH-value of 55 mgKOH/g with the starting components being propylene oxide and n-butanol.

TD-10: a polyoxyalkylene monoether alcohol having an oxypropylene group accounting for 100 wt. % of the oxyalkylene group of the polyoxyalkylene monoether alcohol, a number-average molecular weight of 1200 g/mol, and an OH-value of 44.65 mgKOH/g with the starting components being propylene oxide and n-butanol.

LB25: polyoxyalkylene monoether alcohol, having an oxyethylene group accounting for 84.4 wt. % of the oxyalkylene group of the polyoxyalkylene monoether alcohol, a number-average molecular weight of 2250 g/mol, an OH value of 25 mgKOH/g, with the starting components being ethylene oxide, propylene oxide and diethylene glycol butyl ether, the weight ratio of ethylene oxide to propylene oxide being 84.4:15.6.

MPEG 1000: a polyoxyalkylene monoether alcohol, having a number-average molecular weight of 1000 g/mol, an OH-value of 56 mgKOH/g with the starting components being ethylene oxide and methanol.

Tetrabutylphosphonium fluoride solution: commercially available from Jin Jin Le Chemical Company.

DABCO NE310: a tertiary amine catalyst having a viscosity 12 mPa·s (25° C.), commercially available from Air Chemistry.

Dibutyl phosphate: commercially available from Sigma-Aldrich Shanghai Trade Co. Ltd.

DBTL12: commercially available from Sigma-Aldrich Shanghai Trade Co. Ltd.

Polyether-Modified Polyisocyanate Composition 1

120 g (0.6571 eq) of hexamethylene diisocyanate trimer 1 and 0.04 g (0.00019 mol) of dibutyl phosphate were added to a 250 mL flask with a dropping funnel and a nitrogen inlet and stirred to obtain a solution. The resulting solution was heated to 120° C. 30 g (0.0298 eq) of TP-10 was added dropwise to the flask over 45 minutes to react until the isocyanate group (NCO) content reached 17.46%, and the heating was terminated to obtain a polyether-modified polyisocyanate composition 1, which was a colorless transparent solution and which satisfied the following characteristic data:

Solid content: 100 wt. %
Relative to the total weight of polyether-modified polyisocyanate composition 1, the NCO content was 17.5 wt. %.
Viscosity (23° C.): 1630 mPa·s
Colour value (Hazen): 14
Isocyanate functionality: 3.05
Relative to the total weight of polyether-modified polyisocyanate composition 1, the amount of the polyoxyalkylene monoether structure was 20 wt. %
Relative to the total weight of the polyether-modified polyisocyanate composition 1, the content of isophorone diisocyanate trimer 0 wt. %.
Wherein, the amount of TP-10 comprised 20 wt. % of the system.

Polyether-Modified Polyisocyanate Composition 2

100 g (0.5476 eq) of hexamethylene diisocyanate trimer 1 and 0.03 g (0.00014 mol) of dibutyl phosphate were added to a 250 mL flask with a dropping funnel and a nitrogen inlet and stirred to obtain a solution. The resulting solution was heated to 120° C. 33.3 g (0.0331 eq) of TP-10 was added dropwise to the flask over 45 minutes to react until the isocyanate group (NCO) content reached 16.29%, and the heating was terminated to obtain a polyether-modified polyisocyanate composition 2, which was a colorless transparent solution and which satisfied the following characteristic data:

Solid content: 100 wt. %
Relative to the total weight of the polyether-modified polyisocyanate composition 2, the NCO content was 16.29 wt. %
Viscosity (23° C.): 1560 mPa·s
Colour value (Hazen): 2
Isocyanate functionality: 3
Relative to the total weight of the polyether-modified polyisocyanate composition 2, the amount of the polyoxyalkylene monoether structure was 24.9 wt. %
Relative to the total weight of the polyether-modified polyisocyanate composition 2, the content of isophorone diisocyanate trimer was 0 wt. %.
Wherein, the amount of TP-10 comprised 24.9 wt. % of the system.

Polyether-Modified Polyisocyanate Composition 3

240 g (1.3143 eq) of hexamethylene diisocyanate trimer 1 and 0.05 g (0.00024 mol) of dibutyl phosphate were added to a 250 mL flask with a dropping funnel and a nitrogen inlet and stirred to obtain a solution. The resulting solution was heated to 120° C. 102 g (0.1012 eq) of TP-10 was added dropwise to the flask over 45 minutes to react until the isocyanate group (NCO) content reached 14.95%, and the heating was terminated to obtain a polyether-modified polyisocyanate composition 3, which was a colorless transparent solution and which satisfied the following characteristic data:

Solid content: 100 wt. %
Relative to the total weight of the polyether-modified polyisocyanate composition 3, the NCO content was 14.95 wt. %
Viscosity (23° C.): 1807 mPa·s
Colour value (Hazen): 35
Isocyanate functionality: 2.95

Relative to the total weight of the polyether-modified polyisocyanate composition 3, the amount of the polyoxyalkylene monoether structure was 29.8 wt. %

Relative to the total weight of the polyether-modified polyisocyanate composition 3, the content of isophorone diisocyanate trimer was 0 wt. %.

Wherein, the amount of TP-10 comprised 29.8 wt. % of the system.

Polyether-Modified Polyisocyanate Composition 4

240 g (1.3143 eq) of hexamethylene diisocyanate trimer 1 was added to a 250 mL flask with a dropping funnel and a nitrogen inlet and stirred to obtain a solution. The resulting solution was heated to 120° C. 129.3 g (0.1283 eq) of TP-10 was added dropwise to the flask over 45 minutes to react until the isocyanate group (NCO) content reached 13.7%, and the heating was terminated to obtain a polyether-modified polyisocyanate composition 4, which was a colorless transparent solution and which satisfied the following characteristic data:

Solid content: 100 wt. %

Relative to the total weight of the polyether-modified polyisocyanate composition 4, NCO content: 13.7 wt. %

Viscosity (23° C.): 1594 mPa·s

Colour value (Hazen): 51

Isocyanate functionality: 2.89

Relative to the total weight of the polyether-modified polyisocyanate composition 4, the amount of the polyoxyalkylene monoether structure was 35.0 wt. %

Relative to the total weight of the polyether-modified polyisocyanate composition 4, the content of isophorone diisocyanate trimer was 0 wt. %.

Wherein, the amount of TP-10 comprised 35.0 wt. % of the system.

Polyether-Modified Polyisocyanate Composition 5

240 g (1.3143 eq) of hexamethylene diisocyanate trimer 1 was added to a 500 mL flask with a dropping funnel and a nitrogen inlet and stirred to obtain a solution. The resulting solution was heated to 120° C. 160.3 g (0.1588 eq) of TP-10 was added dropwise to the flask over 45 minutes to react until the isocyanate group (NCO) content reached 12.18%, and the heating was terminated to obtain a polyether-modified polyisocyanate composition 5, which was a colorless transparent solution and which satisfied the following characteristic data:

Solid content: 100 wt. %

Relative to the total weight of the polyether-modified polyisocyanate composition 5, NCO content: 12.18 wt. %

Viscosity (23° C.): 1948 mPa·s

Colour value (Hazen): 36

Isocyanate functionality: 2.80

Relative to the total weight of the polyether-modified polyisocyanate composition 5, the amount of the polyoxyalkylene monoether structure was 40 wt. %

Relative to the total weight of the polyether-modified polyisocyanate composition 5, the content of isophorone diisocyanate trimer was 0 wt. %.

Wherein, the amount of TP-10 comprised 40.0 wt. % of the system.

Polyether-Modified Polyisocyanate Composition 6

120 g (0.6766 eq) of hexamethylene diisocyanate trimer 2 and 0.0362 g (0.00017 mol) of dibutyl phosphate were added to a 250 mL flask with a dropping funnel and a nitrogen inlet and stirred to obtain a solution. The resulting solution was heated to 120° C. A mixture of 30.60 g (0.0364 eq) of T01-A and 20.4 g (0.0165 eq) of TP-10 was added dropwise to the flask over 45 minutes to react until the isocyanate group (NCO) content reached 15.44%, and the heating was terminated to obtain a polyether-modified polyisocyanate composition 6, which was a colorless transparent solution and which satisfied the following characteristic data:

Solid content: 100 wt. %

Relative to the total weight of the polyether-modified polyisocyanate composition 6, NCO content: 15.44 wt. %

Viscosity (23° C.): 1012 mPa·s

Colour value (Hazen): 39

Isocyanate functionality: 3.04

Relative to the total weight of the polyether-modified polyisocyanate composition 6, the amount of the polyoxyalkylene monoether structure was 29.82 wt. %

Relative to the total weight of the polyether-modified polyisocyanate composition 6, the content of isophorone diisocyanate trimer was 0 wt. %.

Wherein, the average number-average molecular weight of T01-A and TP-10 was 923 g/mol, and the total amount by weight of T01-A and TP-10 comprised 29.82 wt. % of the system.

Polyether-Modified Polyisocyanate Composition 7

160 g (0.8857 eq) of hexamethylene diisocyanate trimer 1 and 0.0068 g (0.000032 mol) of dibutyl phosphate were added to a 250 mL flask with a dropping funnel and a nitrogen inlet and stirred to obtain a solution. The resulting solution was heated to 120° C. A mixture of 52.33 g (0.0523 eq) of TP-10 and 16.24 g (0.0072 eq) of LB25 was added dropwise to the flask over 45 minutes to react until the isocyanate group (NCO) content reached 15.02%, and the heating was terminated to obtain a polyether-modified polyisocyanate composition 7, which was a colorless transparent solution and which satisfied the following characteristic data:

Solid content: 100 wt. %

Relative to the total weight of the polyether-modified polyisocyanate composition 7, NCO content: 15.02 wt. %

Viscosity (23° C.): 1654 mPa·s

Colour value (Hazen): 6

Isocyanate functionality: 2.98

Relative to the total weight of the polyether-modified polyisocyanate composition 7, the amount of the polyoxyalkylene monoether structure was 29.82 wt. %

Relative to the total weight of the polyether-modified polyisocyanate composition 7, the content of isophorone diisocyanate trimer was 0 wt. %.

Wherein, the average number-average molecular weight of TP-10 and LB 25 was 1151 g/mol; and the total amount by weight of TP-10 and LB 25 comprised 29.82 wt. % of the system; the average of the oxypropylene group content of TP-10 and the oxypropylene group content of LB25 was 80 wt. %.

Polyether-modified polyisocyanate composition 8

160 g (0.8858 eq) of hexamethylene diisocyanate trimer 1 and 0.007 g (0.000033 mol) of dibutyl phosphate were added to a 250 mL flask with a dropping funnel and a nitrogen inlet and stirred to obtain a solution. The resulting solution was heated to 120° C. A mixture of 27.43 g (0.0274 eq) of TP-10 and 41.14 g (0.0183 eq) of LB25 was added dropwise to the flask over 45 minutes to react until the isocyanate group (NCO) content reached 15.31%, and the heating was terminated to obtain a polyether-modified polyisocyanate composition 8, which was a colorless transparent solution and which satisfied the following characteristic data:

Solid content: 100 wt. %

Relative to the total weight of the polyether-modified polyisocyanate composition 8, NCO content: 15.31 wt. %

Viscosity (23° C.): 1574 mPa·s
Colour value (Hazen): 9
Isocyanate functionality: 3.03
Relative to the total weight of the polyether-modified polyisocyanate composition 8, the amount of the polyoxyalkylene monoether structure was 29.82 wt. %
Relative to the total weight of the polyether-modified polyisocyanate composition 8, the content of isophorone diisocyanate trimer was 0 wt. %.
Wherein, the average number-average molecular weight of TP-10 and LB 25 was 1500 g/mol, and the total amount by weight of TP-10 and LB 25 comprised 29.82 wt. % of the system, the average of the oxypropylene group content of TP-10 and the oxypropylene group content of LB25 was 49.4 wt. %.

Polyether-Modified Polyisocyanate Composition 9

160 g (0.8857 eq) of hexamethylene diisocyanate trimer 1 and 0.0068 g (0.000032 mol) of dibutyl phosphate were added to a 500 mL flask with a dropping funnel and a nitrogen inlet and stirred to obtain a solution. The resulting solution was heated to 120° C. A mixture of 35.4 g (0.0427 eq) of T01-A and 33.1 g (0.0147 eq) of LB25 was added dropwise to the flask over 45 minutes to react until the isocyanate group (NCO) content reached 15.01%, and the heating was terminated to obtain a polyether-modified polyisocyanate composition 9, which was a colorless transparent solution and which satisfied the following characteristic data:
Solid content: 100 wt. %
Relative to the total weight of the polyether-modified polyisocyanate composition 9, NCO content: 15.01 wt. %
Viscosity (23° C.): 1537 mPa·s
Colour value (Hazen): 116
Isocyanate functionality: 2.99
Relative to the total weight of the polyether-modified polyisocyanate composition 9, the amount of the polyoxyalkylene monoether structure was 29.82 wt. %
Relative to the total weight of the polyether-modified polyisocyanate composition 9, the content of isophorone diisocyanate trimer was 0 wt. %.
Wherein, the average number-average molecular weight of T01-A and LB 25 was 1159 g/mol, and the total amount by weight of T01-A and LB 25 comprised 29.82 wt. % of the system, the average of the oxypropylene group content of T01-A and the oxypropylene group content of LB 25 was 60 wt. %.

Polyether-Modified Polyisocyanate Composition 10

160 g (0.8857 eq) of hexamethylene diisocyanate trimer 1 and 0.0068 g (0.000032 mol) of dibutyl phosphate were added to a 500 mL flask with a dropping funnel and a nitrogen inlet and stirred to obtain a solution. The resulting solution was heated to 120° C. A mixture of 45.48 g (0.0455 eq) of TP-10 and 23.10 g (0.0103 eq) of LB25 was added dropwise to the flask over 45 minutes to react until the isocyanate group (NCO) content reached 14.96%, and the heating was terminated to obtain a polyether-modified polyisocyanate composition 10, which was a colorless transparent solution and which satisfied the following characteristic data:
Solid content: 100 wt. %
Relative to the total weight of the polyether-modified polyisocyanate composition 10, NCO content: 14.96 wt. %
Viscosity (23° C.): 1762 mPa·s
Colour value (Hazen): 12
Isocyanate functionality: 3.0
Relative to the total weight of the polyether-modified polyisocyanate composition 10, the amount of the polyoxyalkylene monoether structure was 29.82 wt. %
Relative to the total weight of the polyether-modified polyisocyanate composition 10, the content of isophorone diisocyanate trimer was 0 wt. %.
Wherein, the average number-average molecular weight of TP-10 and LB 25 was 1230 g/mol, and the total amount by weight of TP-10 and LB 25 comprised 29.82 wt. % of the system, the average of the oxypropylene group content of TP-10 and the oxypropylene group content of LB25 was 72 wt. %.

Polyether-Modified Polyisocyanate Composition 11

70 g (0.3887 eq) of hexamethylene diisocyanate trimer 1, 35 g (0.1815 eq) of hexamethylene diisocyanate uretdione 3 and 0.0021 g of DBTL12 were added to a 250 mL flask with a dropping funnel and a nitrogen inlet and stirred to obtain a solution. The resulting solution was heated to 50° C. 45 g (0.0455 eq) of TP-10 was added dropwise to the flask over 45 minutes to react until the isocyanate group (NCO) content reached 14.48%, and the heating was terminated to obtain a polyether-modified polyisocyanate composition 11, which was a colorless transparent solution and which satisfied the following characteristic data:
Solid content: 100 wt. %
Relative to the total weight of the polyether-modified polyisocyanate composition 11, NCO content: 14.48 wt. %
Viscosity (23° C.): 1144 mPa·s
Colour value (Hazen): 14
Isocyanate functionality: 2.70
Relative to the total weight of the polyether-modified polyisocyanate composition 11, the amount of the polyoxyalkylene monoether structure was 29.82 wt. %
Relative to the total weight of the polyether-modified polyisocyanate composition 11, the content of isophorone diisocyanate trimer was 0 wt. %.
Wherein, the amount by weight of TP-10 comprised 29.82 wt. % of the system.

Polyether-Modified Polyisocyanate Composition 12

315 g (1.7490 eq) of hexamethylene diisocyanate trimer 1, 105 g (0.5445 eq) of hexamethylene diisocyanate uretdione 3 and 0.008 g of DBTL12 were added to a 500 mL flask with a dropping funnel and a nitrogen inlet and stirred to obtain a solution. The resulting solution was heated to 50° C. 180 g (0.1822 eq) of TP-10 was added dropwise to the flask over 45 minutes to react until the isocyanate group (NCO) content reached 14.67%, and the heating was terminated to obtain a polyether-modified polyisocyanate composition 12, which was a colorless transparent solution and which satisfied the following characteristic data:
Solid content: 100 wt. %
Relative to the total weight of the polyether-modified polyisocyanate composition 12, NCO content: 14.67 wt. %
Viscosity (23° C.): 1252 mPa·s
Colour value (Hazen): 13
Isocyanate functionality: 2.76
Relative to the total weight of the polyether-modified polyisocyanate composition 12, the amount of the polyoxyalkylene monoether structure was 29.82 wt. %
Relative to the total weight of the polyether-modified polyisocyanate composition 12, the content of isophorone diisocyanate trimer was 0 wt. %.
Wherein, the amount by weight of TP-10 comprised 29.82 wt. % of the system.

Comparative Polyether-Modified Polyisocyanate Composition 1

160 g (0.8305 eq) of hexamethylene diisocyanate trimer 1 and 0.0059 g (0.000026 mol) of dibutyl phosphate were added to a 250 mL flask with a dropping funnel and a nitrogen inlet and stirred to obtain a solution. The resulting solution was heated to 120° C. 17.8 g (0.0178 eq) of TP-10 was added dropwise to the flask over 45 minutes to react until the isocyanate group (NCO) content reached 20.46%, and the heating was terminated to obtain a comparative polyether-modified polyisocyanate composition 1, which was a colorless transparent solution and which satisfied the following characteristic data:
Solid content: 100 wt. %
Relative to the total weight of Comparative polyether-modified polyisocyanate composition 1, NCO content: 20.46 wt. %
Viscosity (23° C.): 1485 mPa·s
Colour value (Hazen): 17
Isocyanate functionality: 3.13
Relative to the total weight of Comparative polyether-modified polyisocyanate composition 1, the amount of the polyoxyalkylene monoether structure was 10 wt. %
Relative to the total weight of Comparative polyether-modified polyisocyanate composition 1, the content of isophorone diisocyanate trimer was 0 wt. %.
Wherein, the amount by weight of TP-10 comprised 10 wt. % of the system.

Comparative Polyether-Modified Polyisocyanate Composition 2

100 g (0.5190 eq) of hexamethylene diisocyanate trimer 1 and 0.0063 g (0.00003 mol) of dibutyl phosphate were added to a 250 mL flask with a dropping funnel and a nitrogen inlet and stirred to obtain a solution. The resulting solution was heated to 120° C. 100 g (0.1012 eq) of TP-10 was added dropwise to the flask over 45 minutes to react until the isocyanate group (NCO) content reached 9.55%, and the heating was terminated to obtain a comparative polyether-modified polyisocyanate composition 2, which was a colorless transparent solution and which satisfied the following characteristic data:
Solid content: 100 wt. %
Relative to the total weight of Comparative polyether-modified polyisocyanate composition 2, NCO content: 9.55 wt. %
Viscosity (23° C.): 2065 mPa·s
Colour value (Hazen): 32
Isocyanate functionality: 2.58
Relative to the total weight of Comparative polyether-modified polyisocyanate composition 2, the amount of the polyoxyalkylene monoether structure was 50 wt. %
Relative to the total weight of Comparative polyether-modified polyisocyanate composition 2, the content of isophorone diisocyanate trimer was 0 wt. %.
Wherein, the amount by weight of TP-10 comprised 50 wt. % of the system.

Comparative Polyether-Modified Polyisocyanate Composition 3

240 g (1.3531 eq) of hexamethylene diisocyanate trimer 2 and 0.06 g (0.00028 mol) of dibutyl phosphate were added to a 500 mL flask with a dropping funnel and a nitrogen inlet and stirred to obtain a solution. The resulting solution was heated to 120° C. 102 g (0.1213 eq) of T01-A was added dropwise to the flask over 45 minutes to react until the isocyanate group (NCO) content reached 15.24%, and the heating was terminated to obtain a comparative polyether-modified polyisocyanate composition 3, which was a colorless transparent solution and which satisfied the following characteristic data:
Solid content: 100 wt. %
Relative to the total weight of Comparative polyether-modified polyisocyanate composition 3, NCO content: 15.24 wt. %
Viscosity (23° C.): 948 mPa·s
Colour value (Hazen): 17
Isocyanate functionality: 2.92
Relative to the total weight of Comparative polyether-modified polyisocyanate composition 3, the amount of the polyoxyalkylene monoether structure was 29.82 wt. %
Relative to the total weight of Comparative polyether-modified polyisocyanate composition 3, the content of isophorone diisocyanate trimer was 0 wt. %.
Wherein, the amount by weight of T01-A comprised 29.82 wt. % of the system.

Comparative Polyether-Modified Polyisocyanate Composition 4

160 g (0.8857 eq) of hexamethylene diisocyanate trimer 1 and 0.043 g (0.0003 mol) of dibutyl phosphate were added to a 500 mL flask with a dropping funnel and a nitrogen inlet and stirred to obtain a solution. The resulting solution was heated to 120° C. A mixture of 24 g (0.0243 eq) of TP-10 and 44.57 g (0.0446 eq) of MPEG1000 was added dropwise to the flask over 45 minutes to react until the isocyanate group (NCO) content reached 14.81%, and the heating was terminated to obtain a comparative polyether-modified polyisocyanate composition 4, which was a colorless transparent solution and which satisfied the following characteristic data:
Solid content: 100 wt. %
Relative to the total weight of Comparative polyether-modified polyisocyanate composition 4, NCO content: 14.81 wt. %
Viscosity (23° C.): 1201 mPa·s
Colour value (Hazen): 11
Isocyanate functionality: 2.95
Relative to the total weight of Comparative polyether-modified polyisocyanate composition 4, the amount of the polyoxyalkylene monoether structure was 29.82 wt. %
Relative to the total weight of Comparative polyether-modified polyisocyanate composition 4, the content of isophorone diisocyanate trimer was 0 wt. %.
Wherein, the average number-average molecular weight of TP-10 and MPEG1000 was 1000 g/mol, and the total amount by weight of TP-10 and MPEG1000 comprised 29.82 wt. % of the system, the average of the oxypropylene group content of TP-10 and the oxypropylene group content of MPEG1000 was 35 wt. %.

Comparative Polyether-Modified Polyisocyanate Composition 5

160 g (0.8305 eq) of hexamethylene diisocyanate uretdione 3 was added to a 500 mL flask with a dropping funnel and a nitrogen inlet and stirred to obtain a solution. The resulting solution was heated to 120° C. 68.57 g (0.0649 eq) of TP-10 was added dropwise to the flask over 45 minutes to react until the isocyanate group (NCO) content reached 13.86%, and the heating was terminated to obtain a comparative polyether-modified polyisocyanate composition 5, which was a colorless transparent solution and which satisfied the following characteristic data:
Solid content: 100 wt. %
Relative to the total weight of Comparative polyether-modified polyisocyanate composition 5, NCO content: 13.86 wt. %
Viscosity (23° C.): 509.6 mPa·s
Colour value (Hazen): 37
Isocyanate functionality: 2.3

Relative to the total weight of Comparative polyether-modified polyisocyanate composition 5, the amount of the polyoxyalkylene monoether structure was 29.82 wt. %

Relative to the total weight of Comparative polyether-modified polyisocyanate composition 5, the content of isophorone diisocyanate trimer was 0 wt. %.

Wherein, the amount by weight of TP-10 comprised 29.82 wt. % of the system.

Comparative Polyether-Modified Polyisocyanate Composition 6

35 g (0.1943 eq) of hexamethylene diisocyanate trimer 1, 70 g (0.3630 eq) of hexamethylene diisocyanate uretdione 3 and 0.0021 g of DBTL12 were added to a 250 mL flask with a dropping funnel and a nitrogen inlet and stirred to obtain a solution. The resulting solution was heated to 50° C. 45 g (0.0455 eq) of TP-10 was added dropwise to the flask over 45 minutes to react until the isocyanate group (NCO) content reached 14.25%, and the heating was terminated to obtain a comparative polyether-modified polyisocyanate composition 6, which was a colorless transparent solution and which satisfied the following characteristic data:

Solid content: 100 wt. %

Relative to the total weight of Comparative polyether-modified polyisocyanate composition 6, NCO content: 14.25 wt. %

Viscosity (23° C.): 639.8 mPa·s
Colour value (Hazen): 9
Isocyanate functionality: 2.49

Relative to the total weight of Comparative polyether-modified polyisocyanate composition 6, the amount of the polyoxyalkylene monoether structure was 29.82 wt. %

Relative to the total weight of Comparative polyether-modified polyisocyanate composition 6, the content of isophorone diisocyanate trimer was 0 wt. %.

Wherein, the amount by weight of TP-10 comprised 29.82 wt. % of the system.

The Process for Preparing the Two-Component Coatings of Examples and Comparative Examples Formulating the A-component: the isocyanate group reactive components Desmophen NH 1420 and Desmophen NH 2850 were mixed in a weight ratio of 4:1 at normal temperature and stirred for 10-30 minutes to obtain the A-component.

Table 1 showed the B-components of the two-component coatings and the coating performance test result of Examples 1-12. Table 2 showed the B-components of the two-component coatings and the coating performance test result of Comparative Examples 1-8. According to the B-components listed in Tables 1 and 2, the B-component and the formulated A-component were mixed, NE310 was added (the amount of NE310 was 0.2 wt. % by weight of the B-component), and the mixture was stirred for 3-5 minutes at normal temperature to obtain the two-component coating. The molar ratio of NCO groups of the B-component to isocyanate-reactive groups of the A-component was 2:1.

TABLE 1

B-components of the two-component coatings and test result of Examples 1-12

| | Example 1 | Example 2 | Example 3 | Example 4 | Example 5 | Example 6 |
|---|---|---|---|---|---|---|
| B-component | Polyether-modified polyisocyanate composition 1 | Polyether-modified polyisocyanate composition 2 | Polyether-modified polyisocyanate composition 3 | Polyether-modified polyisocyanate composition 4 | Polyether-modified polyisocyanate composition 5 | Polyether-modified polyisocyanate composition 6 |
| Working time/min | 24 | 23 | 26 | 26 | 35 | 20 |
| surface-drying time/min | 55 | 74 | 73 | 78 | 96 | 65 |
| Pendulum hardness (7 d) | 138 | 118 | 110 | 103 | 63 | 115 |
| BFFT/μm | 100-200 | 100-200 | 200 | 200-400 | 200-400 | 200-400 |

| | Example 7 | Example 8 | Example 9 | Example 10 | Example 11 | Example 12 |
|---|---|---|---|---|---|---|
| B-component | Polyether-modified polyisocyanate composition 7 | Polyether-modified polyisocyanate composition 8 | Polyether-modified polyisocyanate composition 9 | Polyether-modified polyisocyanate composition 10 | Polyether-modified polyisocyanate composition 11 | Polyether-modified polyisocyanate composition 12 |
| Working time/min | 24 | 25 | 28 | 30 | 30 | 29 |
| surface-drying time/min | 103 | 111 | 87 | 85 | 79 | 80 |
| Pendulum hardness (7 d) | 98 | 93 | 80 | 96 | 86 | 77 |
| BFFT/μm | 200+ | 200 | 200 | 200 | 200 | 200 |

TABLE 2

B-components of the two-component coatings and test result of Comparative Examples 1-8

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| B-component | Comparative polyether-modified polyisocyanate composition 1 | Comparative polyether-modified polyisocyanate composition 2 | Hexamethylene diisocyanate trimer 1 | Comparative polyether-modified polyisocyanate composition 3 | Hexamethylene diisocyanate trimer 2 | Comparative polyether-modified polyisocyanate composition 4 | Comparative polyether-modified polyisocyanate composition 5 | Comparative polyether-modified polyisocyanate composition 6 |

TABLE 2-continued

B-components of the two-component coatings and test result of Comparative Examples 1-8

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Working time/min | 18 | 43 | 18 | 17 | 16 | 22 | 25 | 31 |
| surface-drying time/min | 41 | 150 | 28 | 65 | 16 | 48 | 220 | 131 |
| Pendulum hardness (7 d) | 128 | 20 | 181 | 68 | 157 | 36 | 35 | 54 |
| BFFT/μm | 100-200 | 400 | <100 | 100-200 | <100 | 100-200 | 400 | 400 |

The two-component coatings of Examples 1-12 had long working times, short surface-drying times, high Pendulum hardnesses and high bubble-free film thicknesses (BFFTs); the two-component coatings had long operable times and high drying efficiency, and the coating layers formed by the coatings had high hardnesses.

B-component of Comparative Example 1 was the comparative polyether-modified polyisocyanate composition 1, the amount of the polyoxyalkylene monoether structure of the comparative polyether-modified polyisocyanate composition 1 was 10 wt. %, the polyoxyalkylene monoether alcohol TP-10 used in its preparation process comprised 10 wt. % of the system for preparing the comparative polyether-modified polyisocyanate composition 1, the two-component coating of Comparative Example 1 had a short working time and the two-component coating had a short operable time.

B-component of Comparative Example 2 was the comparative polyether-modified polyisocyanate composition 2, the amount of the polyoxyalkylene monoether structure of the comparative polyether-modified polyisocyanate composition 2 was 50 wt. %, the polyoxyalkylene monoether alcohol TP-10 used in its preparation process comprised 50 wt. % of the system for preparing the comparative polyether-modified polyisocyanate composition 2, the two-component coating of Comparative Example 2 had a long surface-drying time, and a low Pendulum hardness, the two-component coating had low drying efficiency, and the coating layer formed from the coating had a low hardness.

The B-component of Comparative Examples 3 and 5 was hexamethylene diisocyanate trimer 1 or 2, which was a polyisocyanate not modified with polyether, and the two-component coating containing hexamethylene diisocyanate trimer 1 or 2 had short working times and low BFFTs, and the two-component coating had a short operable time.

The B-component of Comparative Example 4 was the comparative polyether-modified polyisocyanate composition 3, the number-average molecular weight of polyoxyalkylene monoether alcohol T01-A used in its preparation process was 800 g/mol, and the two-component coating of Comparative Example 4 had a short working time, and the two-component coating had a short operable time.

The B-component of Comparative Example 6 was the comparative polyether-modified polyisocyanate composition 4, the oxypropylene group of the polyoxyalkylene monoether alcohol used in the preparation process of the comparative polyether-modified polyisocyanate composition 4 comprised less than 45 wt. % of the oxyalkylene group of the polyoxyalkylene monoether alcohol, the two-component coating of Comparative Example 6 had a low Pendulum hardness, and the coating layer formed from the two-component coating had a low hardness.

B-component of Comparative Example 7 was the comparative polyether-modified polyisocyanate composition 5, the polyisocyanate used in its preparation process was hexamethylene diisocyanate uretdione 3, which did not contain hexamethylene diisocyanate trimer, the two-component coating of Comparative Example 7 had a long surface-drying time and a low Pendulum hardness, the two-component coating had low drying efficiency, and the coating layer formed from the coating had a low hardness.

The polyisocyanates used in the preparation process of the polyether-modified polyisocyanate composition of the B-components of Examples 11-12 and Comparative Example 8 were all a mixture of hexamethylene diisocyanate trimer 1 and hexamethylene diisocyanate uretdione 3, and the differences were that hexamethylene diisocyanate trimers of Examples 11 and 12 comprised at least 35 wt. % of the polyisocyanates of the system, the working time, the surface-drying time and the Pendulum hardness of the two-component coatings of Examples 11 and 12 were remarkably better than those of Comparative Example 8, that is to say, the operable time and the drying efficiency of the two-component coatings and the hardness of the coating layers formed from the coatings of Examples 11 and 12 were remarkably better than those of Comparative Example 8.

It will be evident to those skilled in the art that the invention is not limited to the details set forth, and that the present invention may be embodied in other specific forms without departing from the spirit or essential characteristics thereof. The present embodiments are therefore to be considered in all respects as illustrative and not limiting, and thereby the scope of the present invention is indicated by the appended claims rather than by the foregoing description; and moreover any changes, as long as it falls within the meaning and range of the equivalence to the claims, should be considered as a part of the present invention.

The invention claimed is:

1. A polyether-modified polyisocyanate composition, which is obtainable by the reaction of a system containing the following components:
   a) a polyisocyanate having an isocyanate group functionality of 2-4.5, containing at least 35 wt. % of hexamethylene diisocyanate trimer, pentamethylene diisocyanate trimer or a combination thereof;
   b) a polyoxyalkylene monoether alcohol; and
   c) optionally a catalyst;
   the polyoxyalkylene monoether alcohol has a number-average molecular weight of 900 g/mol-2000 g/mol and an oxypropylene group content of 80 wt. %-100 wt. %, relative to the total weight of the oxyalkylene group of the polyoxyalkylene monoether alcohol;

the system has an equivalent ratio of isocyanate group to hydroxyl group of 5:1-110:1; the polyisocyanate composition has the following characteristics:
   i) the average isocyanate functionality is 1.8-4.1;
   ii) the isocyanate group content is 8 wt. %-20 wt. %, relative to the total weight of the polyisocyanate composition; and
   iii) the amount of the polyoxyalkylene monoether structure is greater than 10 wt. % and less than 50 wt. %, relative to the total weight of the polyisocyanate composition.

2. The polyether-modified polyisocyanate composition according to claim 1, characterized in that the amount of the polyoxyalkylene monoether structure is 15 wt. %-45 wt. %, relative to the total weight of the polyisocyanate composition.

3. The polyether-modified polyisocyanate composition according to claim 1, characterized in that the component a) polyisocyanate having an isocyanate group functionality of 2-4.5 further contains an additional isocyanate, the additional isocyanate is one or more of the following: aliphatic isocyanate uretdione and aliphatic isocyanate biuret.

4. The polyether-modified polyisocyanate composition according to claim 3, characterized in that the additional isocyanate is one or more of the following: hexamethylene diisocyanate uretdione and pentamethylene diisocyanate uretdione.

5. The polyether-modified polyisocyanate composition according to claim 1, characterized in that the amount of the polyoxyalkylene monoether alcohol is greater than 10 wt. % and less than 50 wt. %, relative to the total weight of the system.

6. The polyether-modified polyisocyanate composition according to claim 1, characterized in that the number-average molecular weight of the component b) polyoxyalkylene monoether alcohol is 920 g/mol-1800 g/mol.

7. The polyether-modified polyisocyanate composition according to claim 1, characterized in that the polyisocyanate composition contains no more than 0.5 wt. % of isophorone diisocyanate trimer, relative to the total weight of the polyisocyanate composition.

8. The polyether-modified polyisocyanate composition according to claim 1, characterized in that the component c) catalyst is one or more of the following: metal catalyst and phosphoric acid catalyst.

9. A process for preparing the polyether-modified polyisocyanate composition according to claim 1, characterized in that a system containing component a) polyisocyanate having an isocyanate group functionality of 2-4.5, component b) polyoxyalkylene monoether alcohol and optionally component c) catalyst is mixed and reacted to form a polyether-modified polyisocyanate composition having the following characteristics: i) the average isocyanate functionality is 1.8-4.1; ii) the isocyanate group content is 8-20 wt. %, relative to the total weight of the polyisocyanate composition; and iii) the amount of the polyoxyalkylene monoether structure is greater than 10 wt. % and less than 50 wt. %, relative to the total weight of the polyisocyanate composition; wherein the component a) polyisocyanate contains at least 35 wt. % of hexamethylene diisocyanate trimer, pentamethylene diisocyanate trimer or a combination thereof; the component b) polyoxyalkylene monoether alcohol has a number-average molecular weight of 900 g/mol-2000 g/mol and an oxypropylene group content of 80 wt. %-100 wt. %, relative to the total weight of the oxyalkylene group of the polyoxyalkylene monoether alcohol; the system has an equivalent ratio of isocyanate group to hydroxyl group of 5:1-110:1.

10. A solvent-borne or solvent-free two-component coating composition, which contains an A-component and a B-component, wherein the A-component is a compound containing an isocyanate-reactive group, and the B-component is the polyether-modified polyisocyanate composition according to claim 1.

11. The two-component coating composition according to claim 10, characterized in that the compound containing an isocyanate-reactive group is an aspartic ester.

12. A substrate coated with the solvent-borne or solvent-free two-component coating composition according to claim 10.

* * * * *